United States Patent
Wang

(10) Patent No.: US 12,084,344 B2
(45) Date of Patent: Sep. 10, 2024

(54) METHOD OF PURIFYING CRUDE LITHIUM BIS(FLUOROSULFONYL)IMIDE

(71) Applicant: Novel Cosmos Advanced Material (Anhui) Co., Ltd., Anhui (CN)

(72) Inventor: Chiwei Wang, Anhui (CN)

(73) Assignee: NOVEL COSMOS ADVANCED MATERIAL(ANHUI) CO., LTD., Anhui (CN)

( * ) Notice: Subject to any disclaimer, the term of this patent is extended or adjusted under 35 U.S.C. 154(b) by 0 days.

(21) Appl. No.: 18/629,509

(22) Filed: Apr. 8, 2024

(65) Prior Publication Data

US 2024/0262688 A1  Aug. 8, 2024

Related U.S. Application Data

(63) Continuation of application No. PCT/CN2023/110970, filed on Aug. 3, 2023.

(30) Foreign Application Priority Data

Aug. 31, 2022 (CN) .......................... 202211055475.1

(51) Int. Cl.
    *C01B 21/086* (2006.01)
    *C01B 21/093* (2006.01)

(52) U.S. Cl.
    CPC .. *C01B 21/0935* (2013.01); *C01B 2210/0003* (2013.01); *C01B 2210/0062* (2013.01)

(58) Field of Classification Search
None
See application file for complete search history.

(56) References Cited

U.S. PATENT DOCUMENTS

2020/0155964 A1   5/2020  Singh et al.

FOREIGN PATENT DOCUMENTS

| | | |
|---|---|---|
| CN | 109734061 A | 5/2019 |
| CN | 110336022 A | 10/2019 |
| CN | 113015692 A | 6/2021 |
| CN | 113646261 A | 11/2021 |
| CN | 113912028 A | 1/2022 |
| CN | 114852977 A | 8/2022 |
| JP | 2016-103468 A | 6/2016 |

*Primary Examiner* — Yun Qian

(74) *Attorney, Agent, or Firm* — MUNCY, GEISSLER, OLDS & LOWE, P.C.

(57) ABSTRACT

A method of purifying a crude lithium bis(fluorosulfonyl) imide, includes adding a water removal agent to a pretreatment liquid containing the crude lithium bis(fluorosulfonyl) imide to perform a dehydration reaction at a temperature ranging from 20° C. to 40° C., reacting the same for an additional 1 h to 6 h after an acid gas stops escaping from the reaction system, and filtering the reaction system to obtain a filtrate; the water removal agent is bismuth trichloride or antimony trichloride. Evaporating and concentrating the filtrate, and recrystallizing the concentrated filtrate are performed to obtain a purified lithium bis(fluorosulfonyl) imide.

8 Claims, No Drawings

METHOD OF PURIFYING CRUDE LITHIUM BIS(FLUOROSULFONYL)IMIDE

CROSS-REFERENCE TO RELATED APPLICATIONS

This application is a continuation of International Application No. PCT/CN2023/110970, filed on Aug. 3, 2023, which claims priority to Chinese Patent Application No. 202211055475.1, filed on Aug. 31, 2022. The disclosures of the aforementioned applications are hereby incorporated by reference in their entireties.

TECHNICAL FIELD

The disclosure relates to the technical field of purification, and in particular to a method of purifying a crude lithium bis(fluorosulfonyl)imide.

BACKGROUND

Lithium bis(fluorosulfonyl)imide (LiFSI) has excellent electrochemical stability, thermal stability and low-temperature performance, and has better adaptability to positive and negative electrode materials of batteries. It is a key high-performance electrolyte material with higher safety in new energy devices, such as primary lithium batteries, secondary lithium ion batteries and supercapacitors, and is a novel lithium salt which is currently most promising in industrialization.

LiFSI is usually synthesized by the following routes: firstly, adding chlorosulfonic acid, thionyl chloride and sulfamic acid for reacting to obtain imidodisulfurylchloride, or adding chlorosulfonic acid with chlorosulfonyl isocyanate for reacting to obtain imidodisulfurylchloride, adding fluorinating reagents to the imidodisulfurylchloride for reacting to obtain imidodisulfurylfluoride (HFSI) or metal salts of HFSI, and adding lithiation reagents (lithium hydroxide or lithium carbonate) to the HFSI or the metal salts of HFSI for reacting to obtain LiFSI. However, in the above synthesis, by-product water is generated. Due to the fact that it is very easy for LiFSI to absorb water, the crude LiFSI may contain some water, even is complexed with one crystal water. It has been found in research that the thermal stability of LiFSI absorbed water becomes poor and it is not suitable for long-term storage. The more water LiFSI contains, the faster it decomposes. Therefore, the water in the crude LiFSI cannot be effectively removed by the conventional physical method. In most cases, the water is removed by adding a water removal agent to the crude LiFSI for chemical reaction.

Currently, the water removal agents commonly used are thionyl chloride or some water-sensitive substances, such as acyl chloride or sulfuryl chloride substances. Although the water removal effects can be achieved, chloride ions will remain, which seriously influences the performance of lithium batteries, and also produces mixed waste gas pollution difficult to process, increasing environmental protection pressure. Therefore, it is urgent to find a LiFSI purification method which has a good water removal effect, does not remain chloride ions, and is safe and environmentally friendly. It is of great significance for ensuring the stability of the electrolyte of lithium batteries and promoting the smooth promotion of the lithium batteries.

SUMMARY OF THE INVENTION

The present disclosure provides a method of purifying a crude lithium bis(fluorosulfonyl)imide.

The purpose of this application is to provide a method of purifying a crude lithium bis(fluorosulfonyl)imide. Bismuth trichloride or antimony trichloride is used as a water removal agent in the present method. The water removed crude LiFSI is recrystallized to obtain high-purity LiFSI with a water content of only 5 parts per million (ppm) to 20 ppm, without remained chloride ions, so as to solve the described problems in the prior art.

The present disclosure adopts the following technical solution to achieve the purpose.

The present disclosure provides for a method of purifying a crude lithium bis(fluorosulfonyl)imide, where the method includes the following step 1 and step 2.

Step 1 includes adding a water removal agent to a pretreatment liquid containing the crude lithium bis(fluorosulfonyl)imide to perform a dehydration reaction at a temperature ranging from 20° C. to 40° C., reacting a mixture of the water removal agent and the pretreatment liquid for an additional 1 h to 6 h after an acid gas stops escaping from the reaction system, and filtering the reaction system to obtain a filtrate; wherein the water removal agent is bismuth trichloride or antimony trichloride.

Step 2 includes evaporating and concentrating the filtrate, and recrystallizing the concentrated filtrate to obtain a purified lithium bis(fluorosulfonyl)imide.

The method of recrystallization in step 2 of the present application may not be limited specially. Recrystallization methods well known to those skilled in the art may be adopted, such as crystallization using a poor solvent of lithium bis(fluorosulfonyl)imide (i.e., a solvent with weak solubility to lithium bis(fluorosulfonyl)imide).

The dehydration principle of bismuth trichloride and antimony trichloride is as follows:

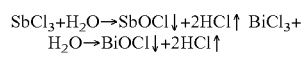

$SbCl_3 + H_2O \rightarrow SbOCl\downarrow + 2HCl\uparrow$    $BiCl_3 + H_2O \rightarrow BiOCl\downarrow + 2HCl\uparrow$ As an embodiment of the present application, in step 1, adding the water removal agent to the pretreatment liquid containing the crude lithium bis(fluorosulfonyl)imide to perform the dehydration reaction at the temperature ranging from 30° C. to 35° C., reacting the mixture of the water removal agent and the pretreatment liquid for 1 h to 2 h after an acid gas stop escaping from the reaction system, and filtering the reaction system to obtain the filtrate.

The preferred reaction conditions in the described embodiment facilitate the progress of the dehydration reaction, and contribute to the removal of water and remained chloride ions in the pretreatment liquid effectively.

As an embodiment of the present application, in step 1, a molar ratio of the water removal agent to $H_2O$ in the pretreatment liquid is 1 to 2:1.

Preferably, in step 1, the molar ratio of the water removal agent to the $H_2O$ in the pretreatment liquid is 1.02 to 1.1:1.

The method of determining the water content in the pretreatment liquid may not be limited specially. Determining methods well known to those skilled in the art may be adopted, such as Karl-Fischer, ect.

The preferred addition of the water removal agent may not only ensure the complete removal of water in the crude lithium bis(fluorosulfonyl)imide, but also remove the remained chloride ions in the pretreatment liquid, so as to obtain the high-purity lithium bis(fluorosulfonyl)imide.

As an embodiment of the present application, in step 1, the time taken for adding the water removal agent ranges from 40 min to 60 min.

Since the dehydration reaction may be exothermic with the addition of the water removal agent, the water removal agent may be added all at once, or preferably may be added in batches by controlling the adding time, so as to ensure that the temperature of the dehydration reaction is less than or equal to 40° C., which can prevent lithium bis(fluorosulfonyl)imide from being decomposed, thereby reducing the purified yield.

As an embodiment of the present application, the process of preparing the pretreatment liquid is: dissolving the crude lithium bis(fluorosulfonyl)imide in the organic solvent; where the organic solvent comprises at least one of dimethyl carbonate, diethyl carbonate, ethyl methyl carbonate, ethylene carbonate, propylene carbonate, diethyl ether, methyl tert-butyl ether, 1,2-dimethoxyethane, acetonitrile, butyl acetate or ethyl acetate.

The source of the crude lithium bis(fluorosulfonyl)imide may not be limited specifically in the present application. Methods for preparing the crude lithium bis(fluorosulfonyl)imide well known to those skilled in the art may be adopted. In the present application, the water content in the crude lithium bis(fluorosulfonyl)imide may be greater than 100 ppm, and the purity may be less than 99.9%.

As an embodiment of the present application, in step 1, the concentration of lithium bis(fluorosulfonyl)imide in the pretreatment liquid is 10 wt % to 25 wt %.

As an embodiment of the present application, in step 1, imidodisulfurylfluoride and a lithiation reagent are mixed to perform the ion exchange reaction and filtered to obtain the pretreatment liquid containing the crude lithium bis(fluorosulfonyl)imide.

The pretreatment liquid containing the crude lithium bis(fluorosulfonyl)imide in the present application may be prepared by the following process: using imidodisulfurylfluoride and a lithiation reagent as raw materials to perform an ion exchange reaction to obtain a mixture, then filtering the mixture to obtain the pretreatment liquid containing the crude lithium bis(fluorosulfonyl)imide. The lithiation reagents are selected from conventional reagents in this field that can undergo lithiation reactions, such as lithium hydroxide or lithium carbonate. The pretreatment liquid containing the crude lithium bis(fluorosulfonyl)imide is directly purified to simplify the reaction steps. The lithium bis(fluorosulfonyl)imide obtained by the method in the present application has high purity, extremely low water content and no remained chloride ions.

The solvents of imidodisulfurylfluoride and lithiation reagents are limited to the same type of solvents in this application. The same type of solvents comprises diethyl ether, methyl tert-butyl ether, diisopropyl ether, dimethyl carbonate, diethyl carbonate, ethyl methyl carbonate. The reaction process of imidodisulfurylfluoride and lithiation reagent may not be limited specifically in the present application. Methods well known to those skilled in the art may be adopted.

As an embodiment of the present application, in step 1, the stirring speed in the dehydration reaction ranges from 60 rpm to 300 rpm.

The preferred stirring speed in the above embodiment can ensure that the components in the reaction system are mixed uniformly, and promote smooth proceeding of the dehydration reaction.

As an embodiment of the present application, in step 1, the acid gas escaped from the reaction system is absorbed by an alkaline solution.

In the present application, bismuth trichloride or antimony trichloride is used as a water removal agent, so the hydrogen chloride gas produced is a single by-product. The hydrogen chloride gas may be easily absorbed to recycle via alkaline solutions, which can avoid mixed waste gas pollution and reduce environmental pressure.

The alkaline solutions may not be limited specially in the present application, such as sodium hydroxide solution, potassium hydroxide solution, sodium carbonate solution, etc.

In some embodiments, the acid gas may be passed through a bubbler into the alkaline solutions for recovery. When the bubbler no longer produces bubbles, it indicates that the acid gas is no longer produced.

As an embodiment of the present application, in step 2, the filtrate is evaporated and concentrated at a temperature ranging from 10° C. to 40° C. and a vacuum ranging from 100 Pa to 600 Pa.

As an embodiment of the present application, in step 2, the concentration of lithium bis(fluorosulfonyl)imide in the concentrated filtrate is 30 wt % to 40 wt %.

The preferred conditions for evaporating and concentrating in the described embodiments facilitate the removal of part of the solvent in the filtrate and the subsequent recrystallization process.

As an embodiment of the present application, in step 1, the filtration of the reaction system is carried out in a glove box with a water content of less than 10 ppm.

After the dehydration reaction of the pretreatment liquid, the water content in the reaction system is very low, basically below 20 ppm. Therefore, it is necessary to filter the reaction system in the glove box, otherwise it will cause the dehydrated reaction system to absorb the water in the environment again, and affect the dehydration effect.

In the present application, bismuth trichloride or antimony trichloride is used as a water removal agent to remove water contained in the crude lithium bis(fluorosulfonyl)imide through the hydrolysis thereof, so as to generate an oxychloride which is difficult to dissolve in both organic solvents and water. Then the oxychloride, which is difficult to dissolve, is removed by filtering, thereby avoiding remaining chloride ions. Furthermore, since the volume of the imidodisulfurylfluoride anion is large, it is difficult for bismuth element or antimony element to form a salt with the imidodisulfurylfluoride, thereby avoiding the generation of new impurities. In addition, under acidic conditions, the metal ions $M^{3+}$ ($Sb^{3+}$ or $Bi^{3+}$) can combine with Cl to form insoluble oxychloride MOCl, thereby facilitating removal of chloride ions in the solution, and obtaining lithium bis(fluorosulfonyl)imide with high purity, extremely low water content and no remained chloride ions.

In the present application, bismuth trichloride or antimony trichloride is used as a water removal agent to remove water contained in the crude lithium bis(fluorosulfonyl)imide, and then evaporation and concentration are performed to remove a part of the organic solvent. Finally, lithium bis(fluorosulfonyl)imide with a purity of 99.95% or higher, a chloride ion content of less than 5 ppm, and a water content of less than 20 ppm is obtained by recrystallization.

DETAILED DESCRIPTION OF ILLUSTRATIVE EMBODIMENTS

In order to make the purpose, technical solution and advantages of the present application more clearly understood, the present application is further described in detail below in conjunction with the examples. It should be understood that the examples described in the present application are only used to interpret the present application and are not intended to limit the present application.

Example 1

The present example provides for a method of purifying a crude lithium bis(fluorosulfonyl)imide, where the method includes the following step 1 and step 2.

Step 1, a crude lithium bis(fluorosulfonyl)imide (37.4 grams (g), 0.2 moles (mol)) with a purity of 98.5% and a water content of 5000 ppm was dissolved in dimethyl carbonate (200 g) to obtain a pretreatment liquid.

Bismuth trichloride (3.47 g) was added to the pretreatment liquid in batches within 40 min at 35° C. for dehydration reaction. The acid gas escaped from the reaction system was passed through a bubbler into sodium hydroxide solution for being absorbed. The reaction system was reacted for an additional 2 h after the acid gas stopped escaping. The reaction system was filtered in a glove box with a water content of less than 10 ppm to obtain a filtrate.

Step 2, the filtrate was evaporated and concentrated at 10° C. and 600 Pa until the concentration of lithium bis(fluorosulfonyl)imide in the concentrated filtrate was 30 wt %. The concentrated filtrate was recrystallized and dried in vacuum to obtain a purified lithium bis(fluorosulfonyl)imide (35.63 g), with a purity of 99.97% and a yield of 96.7%.

Example 2

The present example provides for a method of purifying a crude lithium bis(fluorosulfonyl)imide, where the method includes the following step 1 and step 2.

Step 1, a crude lithium bis(fluorosulfonyl)imide (37.4 grams (g), 0.2 moles (mol)) with a purity of 98.2% and a water content of 6000 ppm was dissolved in propylene carbonate (300 g) to obtain a pretreatment liquid.

Antimony trichloride (5.4 g) was added to the pretreatment liquid in batches within 50 min at 20° C. for dehydration reaction. The acid gas escaped from the reaction system was passed through a bubbler into sodium hydroxide solution for being absorbed. The reaction system was reacted for an additional 5.5 h after the acid gas stopped escaping. The reaction system was filtered in a glove box with a water content of less than 10 ppm to obtain a filtrate.

Step 2, the filtrate was evaporated and concentrated at 25° C. and 350 Pa until the concentration of lithium bis(fluorosulfonyl)imide in the concentrated filtrate was 35 wt %. The concentrated filtrate was recrystallized and dried in vacuum to obtain a purified lithium bis(fluorosulfonyl)imide (35.46 g), with a purity of 99.96% and a yield of 96.5%.

Example 3

The present example provides for a method of purifying a crude lithium bis(fluorosulfonyl)imide, where the method includes the following step 1 and step 2.

Step 1, a crude lithium bis(fluorosulfonyl)imide (37.4 grams (g), 0.2 moles (mol)) with a purity of 98.1% and a water content of 6800 ppm was dissolved in methyl tert-butyl ether (115 g) to obtain a pretreatment liquid.

Bismuth trichloride (4.5 g) was added to the pretreatment liquid in batches within 60 min at 40° C. for dehydration reaction. The acid gas escaped from the reaction system was passed through a bubbler into sodium hydroxide solution for being absorbed. The reaction system was reacted for an additional 3 h after the acid gas stopped escaping. The reaction system was filtered in a glove box with a water content of less than 10 ppm to obtain a filtrate.

Step 2, the filtrate was evaporated and concentrated at 40° C. and 100 Pa until the concentration of lithium bis(fluorosulfonyl)imide in the concentrated filtrate was 40 wt %. The concentrated filtrate was recrystallized and dried in vacuum to obtain a purified lithium bis(fluorosulfonyl)imide (35.53 g), with a purity of 99.96% and a yield of 96.8%.

In order to better illustrate the technical solution of the present application, the following comparative examples are made for further comparison with the examples of the present application. Comparative Example 1.

The present comparative example provides for a method of purifying a crude lithium bis(fluorosulfonyl)imide. The difference from Example 1 lied in that, in step 1, 3.47 g of bismuth trichloride was replaced with 1.78 g of anhydrous ferric trichloride (the molar ratio of the water removal agent to the water content was the same as that in Example 1). A purified lithium bis(fluorosulfonyl)imide (30.99 g), with a purity of 93.5% and a yield of 78.4% was obtained.

Comparative Example 2

The present comparative example provides for a method of purifying a crude lithium bis(fluorosulfonyl)imide. The difference from Example 1 lied in that, in step 1, 3.47 g of bismuth trichloride was replaced with 1.47 g of aluminum trichloride (the molar ratio of the water removal agent to the water content was the same as that in Example 1). A purified lithium bis(fluorosulfonyl)imide (33.05 g), with a purity of 95.2% and a yield of 85.4% was obtained.

In order to better illustrate the advantageous effects of the method of purifying the lithium bis(fluorosulfonyl)imide provided in the present application, the water content and chloride ion content in the purified lithium bis(fluorosulfonyl)imide prepared in Examples 1 to 3 and Comparative Examples 1 to 2 were detected, and the detection results were shown in Table 1 below.

TABLE 1

Detection Results of Water Content and Chloride Ion Content

| Items | water content/ppm | chloride ion content/ppm |
|---|---|---|
| Example 1 | 10 | 4 |
| Example 2 | 20 | 4.5 |
| Example 3 | 15 | 5 |
| Comparative Example 1 | 80 | 30 |
| Comparative Example 2 | 65 | 42 |

The water content and chloride ion content in the described lithium bis(fluorosulfonyl)imide in Examples and Comparative Examples were obtained according to the method of Chinese Chemical Industry Standard HG/T 4066-2015 lithium hexafluorophosphate.

It can be seen from Table 1 that, in the present application, bismuth trichloride or antimony trichloride is used as a water removal agent, which can not only significantly remove water contained in the crude lithium bis(fluorosulfonyl)imide, but also remove the remained chloride ions thereof, so as to obtain purified lithium bis(fluorosulfonyl)imide having a water content of less than 20 ppm, a chloride ion content of less than 5 ppm, and a purity of 99.95% or higher.

The above-mentioned embodiments are only used to illustrate the technical solutions of the disclosure, but not to limit the disclosure. However, these modifications or replacements do not make the essence of the corresponding technical solutions deviate from the spirit and scope of the technical solutions of the embodiments of the present application, and should be included within the protection scope of the present application.

What is claimed is:

1. A method of purifying a crude lithium bis(fluorosulfonyl)imide, the method comprising:
   step 1, adding a water removal agent to a pretreatment liquid containing the crude lithium bis(fluorosulfonyl)imide to perform a dehydration reaction at a temperature ranging from 20° C. to 40° C., reacting a mixture of the water removal agent and the pretreatment liquid for an additional 1 hour (h) to 6 h after an acid gas stops escaping from the mixture of the water removal agent and the pretreatment liquid, and filtering the mixture of the water removal agent and the pretreatment liquid to obtain a filtrate; wherein the water removal agent is bismuth trichloride or antimony trichloride; and
   step 2, evaporating and concentrating the filtrate at a temperature ranging from 10° C. to 40° C. and a vacuum ranging from 100 Pa to 600 Pa, and recrystallizing the concentrated filtrate to obtain a purified lithium bis(fluorosulfonyl)imide,
   wherein in step 1, a molar ratio of the water removal agent to $H_2O$ in the pretreatment liquid is 1 to 2:1, and
   wherein in step 1, the pretreatment liquid comprises the crude lithium bis(fluorosulfonyl)imide and an organic solvent; and the organic solvent comprises at least one of dimethyl carbonate, diethyl carbonate, ethyl methyl carbonate, ethylene carbonate, propylene carbonate, diethyl ether, methyl tert-butyl ether, 1,2-dimethoxyethane, acetonitrile, butyl acetate or ethyl acetate.

2. The method of claim 1, wherein in step 1, the molar ratio of the water removal agent to the $H_2O$ in the pretreatment liquid is 1.02 to 1.1:1.

3. The method of claim 1, wherein in step 1, a time taken for adding the water removal agent ranges from 40 minutes (min) to 60 min.

4. The method of claim 1, wherein in step 1, a concentration of lithium bis(fluorosulfonyl)imide in the pretreatment liquid is 10 percent by weight (wt %) to 25 wt %.

5. The method of claim 1, wherein in step 1, imidodisulfurylfluoride and a lithiation reagent are mixed to perform an ion exchange reaction and filtered to obtain the pretreatment liquid containing the crude lithium bis(fluorosulfonyl)imide; the lithiation reagent is selected from lithium hydroxide or lithium carbonate.

6. The method of claim 1, wherein in step 1, a stirring speed in the dehydration reaction ranges from 60 revolutions per minute (rpm) to 300 rpm.

7. The method of claim 1, wherein in step 1, the acid gas escaped from the mixture of the water removal agent and the pretreatment liquid is absorbed by an alkaline solution.

8. The method of claim 1, wherein in step 2, the concentration of lithium bis(fluorosulfonyl)imide in the concentrated filtrate is 30 wt % to 40 wt %.

* * * * *